United States Patent Office 2,705,160
Patented Mar. 29, 1955

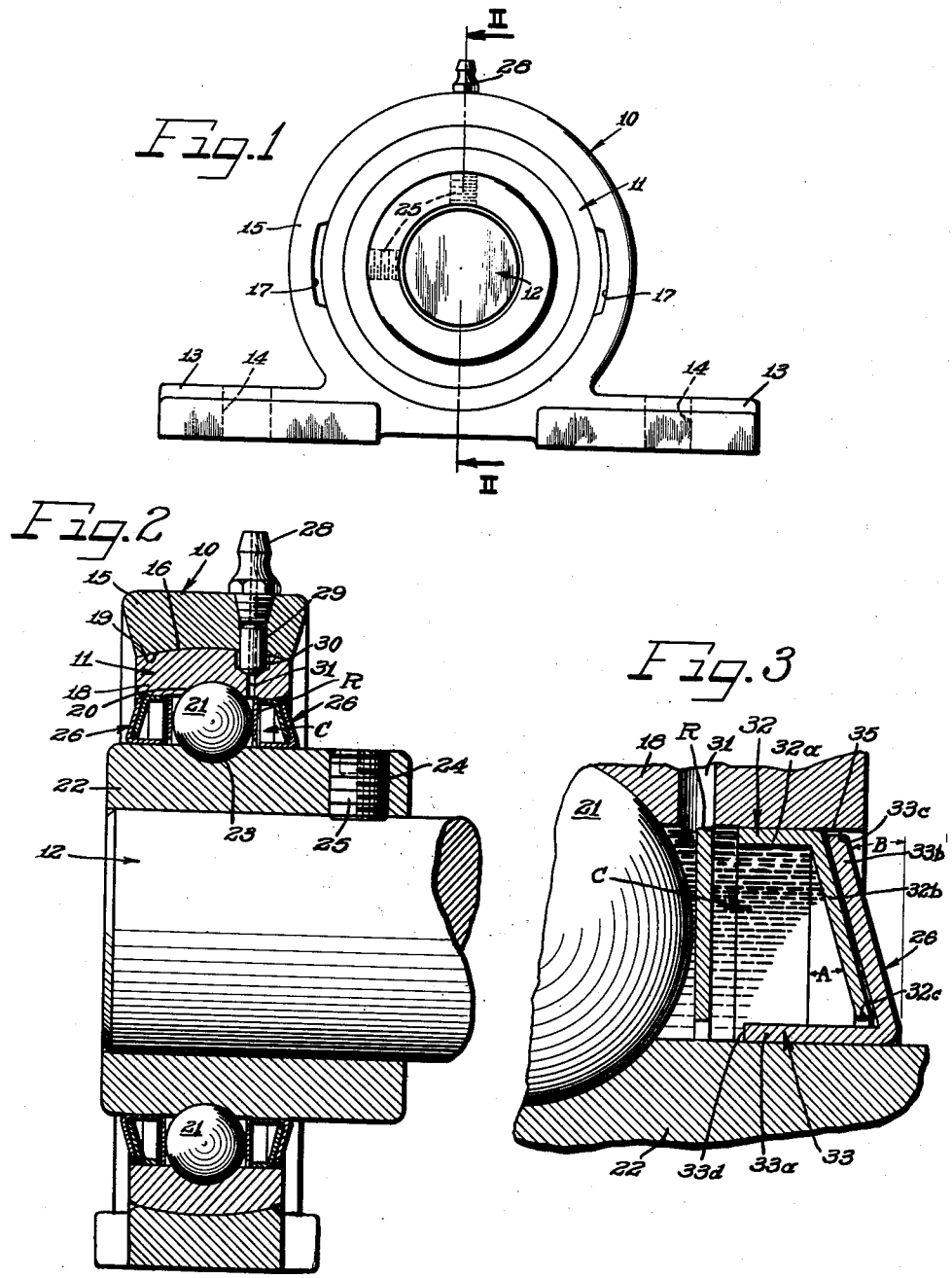

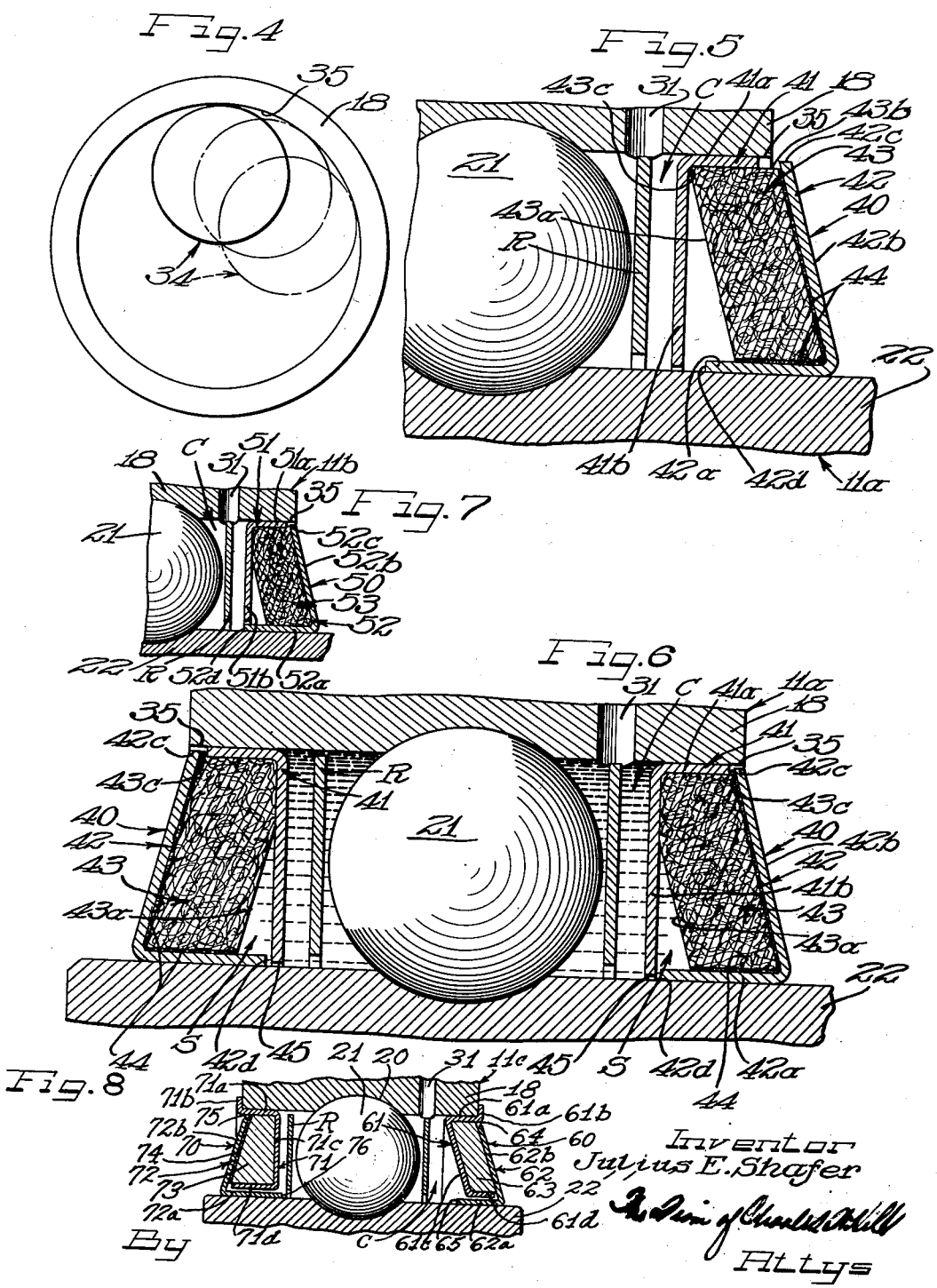

2,705,160

BEARING SEAL

Julius E. Shafer, Chicago, Ill.; The Northern Trust Company, executor of said Shafer, deceased Application December 27, 1949, Serial No. 135,051

3 Claims. (Cl. 286—5)

This invention relates to sealed bearing units, and more specifically deals with dirt and lubricant seals for industrial anti-friction bearing units.

The invention will hereinafter be described in connection with an industrial ball bearing unit mounted in a pillow block, but it should be understood that the seals of this invention are generally applicable to seal off the anti-friction element chamber of any type of anti-friction bearing without interfering with free relative rotation of the race rings of the unit.

In accordance with this invention, a metal retainer ring is pressed into the outer race ring of the bearing unit and extends inwardly into close proximity with the inner race ring. A metal flinger ring is pressed onto the inner race ring and has a base portion extending axially inward to form a sharp shoulder which will discharge grease away from the gap between the end of the retainer and the base. The flinger has a flange which extends radially outward and axially inward from the base into close-running clearance relationship with the inner surface of the outer race ring and this surface in the vicinity of the flinger flange edge is carefully sized relative to the flinger flange so that very close-running clearances of uniform magnitude are obtained. In one embodiment of the invention, the retainer is in close-running clearance parallel relation with the flinger flange. In another embodiment the retainer and flinger are spaced to form a chamber therebetween for receiving a flexible sealing ring. In this embodiment the sloping flinger flange tilts the sealing ring so that a portion of its inner face is deformed into sealed engagement with the retainer.

An important feature of the invention resides in the accurate sizing of the outer end portions of the inner surface of the outer race ring of the bearing so that these portions will have spaced sealing relationship with the relatively rotating outer edge of the flinger flange.

Another feature of the invention resides in the provision of flat bases or rim flanges on metal sealing rings for forming the sole means of attaching the rings to a bearing unit to maintain overlapping flange portions of the rings in close-running clearance relationship.

A further feature of the invention is to confine the loading of a flexible seal ring in a bearing seal to a selectively controlled area of the ring.

It is, then, an object of the invention to provide a bearing seal composed of two metal rings each having flat rim portions and inclined flange portions adapted to be maintained in overlapped close-running clearance relationship by pressing the rim portions into or on the race rings of a bearing.

A still further object of the invention is to provide a seal for bearings wherein the outer race ring of the bearing has an accurately sized surface in close-running clearance relationship with the edge of a seal plate to enhance the sealing capacity thereof.

Another object of the invention is to provide an inexpensive seal for bearings by utilizing the sealing effect of a surface on the outer race ring of the bearing in addition to surfaces of the seal parts.

A still further object of the invention is to provide a bearing seal composed of two metal rings including a flinger ring having a flat inner rim and a sloping side wall together with a retainer ring having a flat outer rim and a side wall mating with the side wall of the flinger.

Another object of this invention is to provide a bearing seal wherein a sloping flinger flange holds a felt seal ring in tilted relation to a retainer and presses a localized area against the retainer to form an interference type seal of controlled magnitude.

Other and further objects of this invention will be apparent to those skilled in the art from the following detailed description of the annexed sheets of drawings which, by way of preferred examples only, illustrate several embodiments of the invention.

On the drawings:

Figure 1 is a side elevational view of a sealed bearing unit according to this invention mounted in a one-piece pillow block.

Figure 2 is a somewhat enlarged vertical cross-sectional view, with parts in side elevation, taken substantially along the line II—II of Figure 1.

Figure 3 is a further enlarged fragmentary vertical cross-sectional view similar to Figure 2 but illustrating further details of the bearing seal.

Figure 4 is a front elevational view of an outer race ring for a bearing unit according to this invention illustrating the manner in which the outer edge portion of the inner surface of this ring is accurately ground to close tolerance limits for having predetermined close-running clearance relationship with the flinger of the seal of this invention.

Figure 5 is a fragmentary view similar to Figure 3, but illustrating the assembly of a modified seal in accordance with this invention.

Figure 6 is a view similar to Figure 5, but illustrating both seals of the bearing in their final assembled form.

Figure 7 is a smaller scale fragmentary view similar to Figures 5 and 6 but showing a further embodiment of the seals of Figures 5 and 6.

Figure 8 is another fragmentary and broken cross sectional view similar to Figure 6 but showing two additional seal embodiments.

As shown on the drawings:

The pillow block unit 10 of Figures 1 and 2 mounts a bearing unit 11 sealed in accordance with this invention, and this bearing unit 11, in turn, rotatably mounts a shaft 12 locked in the inner race ring thereof. The pillow block 10 has mounting feet 13, 13 with holes or slots 14, 14 therein to receive bolts (not shown) for securing the feet in position as desired. A one-piece annular strap 15 is integrally formed between the feet 13, 13 and has slots 17, 17 in the concave segmental spherical inner bearing portion 16 thereof which are in spaced opposed relationship to increase the width of the bearing wall 16 so that the unit 11 can be inserted horizontally through the slots 17 and then tilted into vertical position to be seated on the bearing wall 16. As shown in Figure 2, the outer race ring 18 of the bearing unit 11 has a convex segmental spherical outer wall 19 mating with the wall 16 of the strap 15 to retain the bearing unit 11 in tiltable relation in the pillow block. The inner surface of the outer race ring 18 is cylindrical and has a central ball groove 20 therearound for receiving a row of ball bearings 21.

The unit 11 includes an inner race ring or sleeve 22 which has a cylindrical outer face with a groove 23 therearound for receiving the ball elements 21. The shaft 12 extends through the bore of the ring 22 and at least one end of the ring projects beyond an end face of the outer ring 18. This projecting portion has several threaded radial holes 24 therethrough and set screws 25 are threaded through these holes to bite into the shaft 12 thereby fixedly locking the shaft and ring against relative rotation.

The row or ring of balls 21 holds the inner and outer race rings 18 and 22 in spaced concentric relation and the grooves 20 and 23 form races for the balls so that the rings are relatively rotatable. At the same time, the races and balls cooperate to hold the rings against relative axial movement. A bearing cage or ball retainer R holds the balls in circumferentially spaced relation and has a pocket for each ball as is customary.

A sealed chamber C is provided between the rings around the row of balls 21 by means of the seals 26 of this invention. Lubricant is supplied to this chamber through a fitting 28 which is threaded into the strap 15 of the pillow block. A locking pin or tube 29 projects from the strap 15 beneath the fitting 28 into a dimple 30 formed in the ring 18. A small bore 31 connects the bottom of this dimple with the chamber C. The pin and dimple relationship permits relative tilting of the ring 18 in the strap 15 but the pin at all times holds the fitting 28 in communication with the chamber C and prevents the ring 18 from rotating in the strap 15.

As best shown in Figure 3, each seal 26 includes a metal retainer ring or plate 32 and a metal flinger ring or plate 33. The retainer 32 has a flat outer rim 32a and a sloping side wall or flange 32b extending radially inward from the rim 32a and axially outward at an angle A therewith. This flange or side wall 32b terminates in a flat edge 32c closely adjacent to the inner race ring 22. The flinger 33 includes a flat inner rim or base 33a which is deeper or longer than the rim 32a of the retainer. This base 33a terminates in a side wall or flange 33b which extends radially outward and axially inward at an angle B from the vertical or right angle relationship with the base. The flange 33b terminates in a flat edge 33c in closely spaced relationship with the outer race ring 18. The angles A and B are identical and are preferably 15°.

The flat rim 32a is sized for press fit relationship into the cylindrical inner circumference of the outer race ring 18 and the rim is sufficiently deep or long to hold the flange 32b against tilting when the rim is press fit into the ring. The flange 32a is forced into the ring 18 by a suitable press-fitting tool to a depth inwardly from the side face of the ring 18. The axial outer end portions of the cylindrical inner circumference of the ring 18 are accurately ground, as indicated in Figure 4, by a grinding wheel 34 which is advanced as indicated in dotted lines along a guided path relative to the ring 18 for producing an accurately finished cylindrical bore surface 35 around the entire circumference of the ring 18. This surface extends outwardly from the rim 32a of the retainer 32 and is accurately sized to have close-running clearance relationship with the edge 33c of the flinger flange 33b. This flinger flange 33b overlies the flange 32b of the retainer 32 in close-running clearance relationship and the inner edge 32c of the flange 32b has close-running clearance relationship with the base 33a adjacent the flange 33b.

The base 33a of the flinger 33 has sufficient axial length or depth to hold the flange 33b in fixed position on the ring 22 and this base is sized for press fit relationship with the ring 22. The end of the base 33 terminates in a vertical shoulder or sharp upstanding edge 33d which is spaced axially inward for a considerable distance from the edge 32c of the retainer 32. In operation of the bearing unit 11, the outer race ring 18 remains stationary with the pillow block 10 while the inner race ring 22 rotates with the shaft 12. The retainer 32 is therefore stationary while the flinger 33 rotates in close-running clearance relationship with the retainer and with the accurately ground portion 35 of the outer race ring. It is desirable to have this close-running clearance relationship in the order of .001 to .002 inch between the edge 33c and the surface 35; .005 to .010 inch between the lapped flanges 32b and 33b and .005 to .010 inch between the edge 32c and the base 32d. Maintenance of these close-running conditions will preclude binding of the parts and at the same time will prevent ingress of dirt or leakage of lubricant.

As illustrated in Figure 3, the sharp shoulder or edge 33d acts as a flinger for grease and prevents the grease from flowing under the edge 32c into the path between the flanges 32b and 33b. The grease, as indicated in dotted lines, will not strike against the flange 32b until it is well spaced from the edge 32c. Any grease which might reach the vicinity of the gap between the edge 32c and the base 33a will be precluded from entering this gap because of the very close clearance relationship between the relatively rotating surfaces which, in effect, form a closed seal. The sloping relationship of the gap or path between the flanges 32b and 33b prevent direct centrifugal action of the flinger tending to throw grease radially out of the path, since this centrifugal action is broken up by the inward slope of the flinger. Conversely, ingress of dirt through the gap between the edge 33c and the surface 35 is prevented by centrifugal action, which tends to throw the dirt off the flinger, and by the very close-running clearance relationship between the parts creating an effective seal. Of course, dirt cannot travel against the action of centrifugal force down through the path between the flanges 32b and 33b.

The seal 26 is therefore an efficient all-metal two-plate or ring arrangement which cooperates with the outer race ring to produce sealing results not heretofore obtainable in all-metal seals. For example, after 500 hours' continuous testing, it was found that the seal 26 did not permit the ingress of dirt or the loss of lubricant.

In the embodiment shown in Figures 5 and 6, the bearing unit 11a, identical with the above-described unit, and having the illustrated parts identified by the same reference numerals used in Figures 1 to 3, is provided with modified seal assemblies 40 according to this invention.

Each seal assembly 40 is composed of a metal retainer ring 41, a metal flinger ring 42 and a flexible sealing ring 43 preferably formed of felt.

The retainer 41 has a flat axially extending rim flange 41a and a flat radially extending side wall 41b at the inner end of the rim 41a. The wall 41b terminates in closely spaced relation to the inner race ring 22 when the rim 41a is press-fitted into the outer race ring 18. As shown in Figure 5, the rim 41a is pressed into the outer race ring 18 beyond the outer edge thereof so as to leave exposed the accurately ground portion 35 of the outer race ring.

The flinger has a flat base or inner rim flange 42a pressed onto the inner race ring 22 and extending axially inward from a sloping flange or side wall 42b. This side wall or flange 42b extends radially outward and axially inward to terminate at a flat outer edge 42c which is adapted to extend under the ground portion 35 in close-running clearance relation therewith.

The sealing ring 43 is, in its free stage, rectangular in cross section with flat inner and outer peripheral walls and flat side faces. The ring 43 fits snugly around the base 42a of the flinger and the outer periphery of the ring terminates inwardly of the flinger edge 42c. When the ring 43 is bottomed against the sloping flinger flange 42b, it will be tilted as shown in Figure 5 to present a sloping free face 43a to the retainer wall 41b and a flat outer peripheral wall 43b to the retainer rim flange 41a. These two walls 43a and 43b intersect at an edge 43c which engages the corner between the flange 41a and the side wall 41b of the retainer when the flinger and seal assembly is pressed into position as shown in Figure 5. The seal ring will have snug seating engagement with the rim flange 41a.

The seal ring 43 is preferably bonded to the flinger 40 by means of a cementitious bond 44 extending over the flinger flange and base portion. When so bonded in position, the base portion of the flinger will extend beyond the face 43a of the seal and will provide a sharp vertical edge 42d normal to the race ring 22.

As shown in Figure 6, when the flinger and seal ring assembly is pressed into operative position with the flinger edge 42c under the ground surface 35, the face 43a of the sealing ring will be deformed from the inclined position to be loaded against the flat wall 41b of the retainer 41. The sealing ring will be compressed at its outer peripheral portion and will tend to bulge at 43c into the gap between the outer edge of the retainer base 41a and the outer end of the flinger flange. Thus the outer peripheral portion of the sealing ring will be loaded and will have an interference fit with the rim flange 41a and the radially outer portion of the side wall 41b of the retainer. The degree of compression or loading of the sealing ring 43 can be controlled by the relative spacing of the retainer and flinger. As shown in Figure 6, it is preferred to have about one-third of the free face 43a of the sealing ring pressed against the retainer wall 41b. In this position, the edge 42d of the flinger base will be closely adjacent the inner end of the retainer wall 41b and a space S will be provided between the retainer wall and felt. This space will communicate with the chamber C only through an angled passage 45 having a horizontal leg under the retainer wall 41b and a vertical leg alongside of the flinger edge 42d. As illustrated on the right hand side of Figure 6, grease in the bearing chamber C that might work through the angled passage 45 to enter the space S will be flung radially outward against the tapered wall 43a of the felt and will then tend to work its way along the compressed felt faces to lubricate these faces which have the interference running fit with the retainer 41. This lubrication of the outer portion of the felt will reduce friction loss and prevent overheating. However, the resilient compression loading of the felt will prevent loss of grease and the bulged portion 43c of the felt will serve as a final stop for the flow of grease, since this portion is firmly compressed and forms a rather solid barrier. Conversely, dirt cannot enter into the space S from outside of the seal because it must not only pass against centrifugal force between the close-running clearance surfaces 42c and 35 but must also work its way inwardly against centrifugal force.

In the embodiment shown in Figures 5 and 6, therefore, a sealing felt or other resilient seal ring is interposed between the retainer and flinger and is partially compressed or loaded so as to have an interference fit with the retainer. The felt is preferably impounded on or otherwise bonded to the flinger to rotate therewith. The flinger tilts the felt so that a portion of its free face will be spaced from the retainer.

A further embodiment is shown in Figure 7, wherein a bearing 11b identical with the bearing unit 11 described in Figures 1 to 3 and having the illustrated parts identified by the same reference numerals, is equipped with a seal 50 according to this invention. The seal 50, like the seal 40, is composed of a retainer 51, a flinger 52, and a felt ring 53 therebetween. The retainer 50 has the flat peripheral rim flange 51a press-fitted into the outer race ring 18 beyond the ground surface 35 and a radially extending side wall 51b. This side wall 51b is shorter than the side wall 41b of the retainer 41 in Figure 5 and terminates considerably outward from the inner race ring 22.

The flinger 52 has the flat base 52a pressed on the inner race ring 22 and the sloping side wall or flinger flange 52b extending radially outward and axially inward from the base to terminate in the outer edge 52c which has close-running clearance relationship with the ground surface 35. The flinger base 52a, however, extends under the retainer side wall 51b so that the sharp edge 52d of the flinger base will be substantially aligned with the inner face of the side wall 51b of the retainer to fling grease outwardly along this face. The seal ring 53 is bonded to the flinger 52 and the seal 50 operates in substantially the same manner as the seal 40.

In the modifications of Figure 8, the bearing 11c has the parts thereof identified by the same reference numerals used to identify the same parts in the bearings 11a and 11b. However, two different types of seal assemblies 60 and 70 respectively are provided to seal the ball chamber C.

The seal 60 includes a metal retainer ring 61, a metal flinger ring 62, and a flexible sealing ring 63 preferably formed of felt. The retainer 61 has a flat axially extending outer rim flange 61a with an upstanding or radially outward end flange 61b at the axial outer end thereof. An inclined side wall 61c extends radially inward and axially outward from the axial inner end of the rim flange 61a at an angle of about 15° from the vertical or right angle relationship with the rim flange. The side wall 61c terminates in an axially outward extending inner rim flange 61d which overlies the inner race ring 22 in spaced parallel relation. The inner and outer rim flanges 61a and 61d are thus in spaced parallel relation to each other.

The retainer 61 has the outer rim flange 61a thereof pressed into the outer race ring 18 until the end flange 61b on this rim is bottomed against the outer face of the race ring as shown in Figure 8.

The flinger 62 is similar to the flinger 42 of Figures 5 and 6 and includes a flat base 62a pressed onto the inner race ring 22 and a sloping side wall or flinger flange 62b extending radially outward and axially inward from the base in parallel relationship to the wall 61c of the retainer. The flinger wall 62b terminates in closely spaced relation with the rim flange 61a of the retainer adjacent the axial outer end of this flange to provide a small running clearance or gap 64.

The felt 63 is carried by the retainer and is pressed into the inclined relationship shown in Figure 8 by the side walls of the flinger and retainer respectively. The inner and outer rim flanges of the retainer plus the inclined side wall 61c form a sufficient friction grip on the felt so that this felt need not be cemented or otherwise bonded to the retainer. The friction grip will be sufficient to retain the felt in fixed relation with the retainer. This fixed relation may be created after initial use of the assembly.

The base 62a of the flinger extends beyond the inner edge of the side wall 61c of the retainer so as to provide a sharp edge or upstanding wall 65 which will fling off grease before the grease can reach the entrance mouth to the passage between the rim flange 61d and the base 62a. The grease will be thrown away from this entrance mouth well along the sloping side wall 61c.

The seal assembly 70 includes a metal retainer ring 71, a metal flinger 72, and a felt 73. The retainer 71 has a flat axially extending outer rim flange 71a pressed into the outer race ring 18 and is equipped with an upstanding or radially outwardly extending end flange 71b which is bottomed against the outer face of the race ring to provide a stop for the press fitting of the retainer in the race ring. A radially extending side wall 71c extends from the axial inner end of the rim flange 71a to an inner rim flange 71d which extends axially outward in spaced parallel relation from the inner race ring 22.

The flinger 72 has a flat base 72a pressed on the inner race ring 22 and underlying the inner rim flange 71d of the retainer in spaced parallel relation therewith. The flinger also has an inclined side wall 72b at an angle of about 15° from the vertical or right angle relationship with the base 72a. This flange 72b extends into closely spaced relation with the rim flange 71a and is inward from the outer end of this rim flange.

The felt 73 is confined between the inner and outer rims 71a and 71d of the retainer and between the side wall 71c and 72b of the retainer and flinger, respectively. Since the side wall 72b of the flinger is inclined and the side wall 71b of the retainer is radial, the felt 73 is compressed at the radially outer area thereof. In order to drive the felt with the flinger, the felt is preferably equipped with a flexible washer 74 secured to its outer face. This washer can be composed of neoprene or other synthetic rubber-like material or plastic. The washer is quite thin and is permanently bonded to the felt. This washer will have frictional engagement with the inclined flange 72b of the flinger and will be driven by the flinger to rotate the felt in the retainer.

As shown, the outer end of the flinger flange 72b terminates in spaced relation inward from the rim flange 71a to provide a gap 75. The neoprene washer 74 spans the inner end of this gap 75.

The inner terminal end of the base 72a provides a sharp shoulder 76 inwardly from the wall 71c of the retainer so that any grease attempting to enter the passage between the base 72a and the rim 71d will be flung outwardly away from the entrance mouth to this passage.

If desired, the friction drive for the felt which is created by the washer 74 can be used in place of the cement bond 44 in the seals 40 and 50. This washer also protects the felt at the gap beyond the end of the flinger.

From the above description, it will be understood that this invention provides effective grease-retaining and dirt-excluding seals for industrial bearing units. The seals of this invention provide a labyrinth sealing passageway of relatively rotating parts which are maintained in such close-running clearance relationship that dirt cannot flow therethrough in one direction, nor can grease flow therethrough in the opposite direction.

It will be understood that modifications and variations may be effected without departing from the scope of the novel concepts of the present invention.

I claim as my invention:

1. A bearing seal comprising a rim flange adapted to be pressed into the inner periphery of the outer race ring of a bearing together with a radially extending wall adapted to bridge the space between the inner and outer race rings of a bearing to terminate in spaced relation from the inner race ring for providing a gap, a flinger having a base adapted to be pressed on the outer periphery of the inner race ring of the bearing and an axially inward and radially outward sloping side wall in non-parallel relation with the radial wall of the retainer ring, a sealing felt bonded to the base and side wall of the flinger to rotate therewith and be held thereby for presenting a tilted face adjacent the radial wall of the retainer for compressive deformation of a portion only of said face by said radial wall and with the remainder of said face spaced from said wall, and said flinger having a wall portion projecting beyond the felt in confronting relation with a wall of the retainer to limit compresof the felt against the retainer and thereby maintain a space between the felt and radial wall of the flinger communicating with said gap.

2. In a bearing seal for ball bearing units having inner and outer race rings held in radially spaced apart relatively rotatable relation, the improvement which comprises a retainer adapted to be press fitted into the inner periphery of the outer race ring of a bearing and having an inwardly extending wall adapted to bridge the space between the inner and outer race rings of the bearing to terminate in spaced relation from the inner race ring and provide a gap, a flinger having a base adapted to be press fitted onto the outer periphery of the inner race ring of a bearing, said flinger having a side wall inclined axially inwardly and radially outwardly in non-parallel relation with the wall of the retainer, a felt carried by the flinger against said inclined side wall and compressively loaded thereby against the outer peripheral portion of the retainer in interference sealing fit relation therewith only at the outer peripheral portion thereof while being held by the flinger in spaced relation from the inner portion of the retainer wall, said side wall of the flinger projecting beyond the felt in close running clearance relation with the outer ring, and said base of the flinger projecting beyond said felt into close running clearance relation with the inner edge of the retainer in confronting relation with the wall of the retainer to limit compression of the felt and maintain the spaced relation of the inner portion of the felt from the inner portion of the retainer wall to provide a space communicating with said gap.

3. A seal assembly comprising a retainer having a radially extending side wall and an axially outwardly extending rim flange, a flinger having a side wall in inclined non-parallel relation with the side wall of the retainer and an axially extending inner rim flange on the inner end of said inclined side wall, a felt between the flinger and retainer, means bonding the felt to the inclined side wall of the flinger for rotation of the felt with the flinger, said side wall of the flinger holding said felt in inclined relation to present an inclined wall to the radially extending side wall of the retainer, the outer peripheral portion of said felt being compressively loaded between the retainer and flinger and the inner peripheral portion of said felt being spaced from the retainer, and said flinger having a wall portion projecting beyond the felt in confronting relation with a wall of the retainer to limit compression of the felt against the retainer and maintain the spaced relation between the inner peripheral portions of the felt and retainer.

References Cited in the file of this patent

UNITED STATES PATENTS

| | | |
|---|---|---|
| 1,420,416 | Dlesk | June 20, 1922 |
| 1,895,288 | Larsh | Jan. 24, 1933 |
| 1,986,621 | Bott | Jan. 1, 1935 |
| 2,189,838 | Shafer | Feb. 13, 1940 |
| 2,275,996 | Searles | Mar. 10, 1942 |
| 2,290,213 | Shafer | July 21, 1942 |
| 2,341,900 | Boden | Feb. 15, 1944 |
| 2,385,306 | Shafer | Sept. 18, 1945 |